United States Patent
Yamato et al.

(10) Patent No.: US 9,260,021 B2
(45) Date of Patent: Feb. 16, 2016

(54) SIGNAL GENERATION CIRCUIT

(71) Applicant: Panasonic Corporation, Kadoma-shi, Osaka (JP)

(72) Inventors: Koji Yamato, Mie (JP); Naoki Fukuo, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 197 days.

(21) Appl. No.: 14/150,310

(22) Filed: Jan. 8, 2014

(65) Prior Publication Data
US 2014/0292256 A1 Oct. 2, 2014

(30) Foreign Application Priority Data
Mar. 28, 2013 (JP) .................. 2013-069914

(51) Int. Cl.
| | |
|---|---|
| *H02J 7/00* | (2006.01) |
| *H02J 7/14* | (2006.01) |
| *H02H 3/00* | (2006.01) |
| *B60L 11/18* | (2006.01) |
| *H02H 3/30* | (2006.01) |

(52) U.S. Cl.
CPC ......... *B60L 11/1809* (2013.01); *B60L 11/1816* (2013.01); *B60L 11/1838* (2013.01); *H02H 3/305* (2013.01); *B60L 2230/12* (2013.01); *B60L 2230/16* (2013.01); *Y02T 10/7005* (2013.01); *Y02T 90/121* (2013.01); *Y02T 90/128* (2013.01); *Y02T 90/14* (2013.01); *Y02T 90/16* (2013.01); *Y02T 90/163* (2013.01)

(58) Field of Classification Search
CPC ... B60L 11/1809; H02H 3/305; H02H 1/0084
USPC .................................. 361/69; 320/107, 104
See application file for complete search history.

(56) References Cited

U.S. PATENT DOCUMENTS

| | | | | |
|---|---|---|---|---|
| 8,215,963 B2* | 7/2012 | Ichikawa | ............. | B60L 11/123 |
| | | | | 439/34 |
| 8,363,364 B2* | 1/2013 | Watanabe | ............. | B60L 3/0069 |
| | | | | 361/42 |
| 8,541,978 B2* | 9/2013 | Fukuo | .................. | B60L 3/0069 |
| | | | | 320/109 |

(Continued)

FOREIGN PATENT DOCUMENTS

| | | | |
|---|---|---|---|
| JP | 2010-123284 A | 1/2010 |
| JP | 2010-110068 A | 5/2010 |

(Continued)

*Primary Examiner* — M'Baye Diao
(74) *Attorney, Agent, or Firm* — Marvin A. Motsenbocker; MOTS LAW, PLLC

(57) ABSTRACT

A signal generation circuit (5) generates a pilot signal for communication between a vehicle equipped with a battery device, and a charging cable. The circuit (5) includes a circuit (5A) includes an operational amplifier (OP1) for outputting the pilot signal, a first input unit (501) for supplying a non-inverted input terminal of the amplifier (OP1) with a first or second signal, a second input unit (51) for supplying an inverted input terminal of the amplifier (OP1) with a first or second voltage, and a control unit (500) for controlling each output of the first and second input units (501, 51). Each of the first signal and the first voltage is a zero voltage. The circuit (5A) is configured so that the amplifier (OP1) outputs a zero voltage if the first signal is supplied to the non-inverted input terminal and the first voltage is supplied to the inverted input terminal.

7 Claims, 5 Drawing Sheets

(56) References Cited

U.S. PATENT DOCUMENTS

| | | | |
|---|---|---|---|
| 8,620,503 B2 * | 12/2013 | Ito | B60L 11/123 701/22 |
| 2012/0098490 A1 * | 4/2012 | Masuda | B60L 3/0069 320/109 |
| 2013/0241482 A1 * | 9/2013 | Flack | G01R 31/2827 320/109 |

FOREIGN PATENT DOCUMENTS

| | | |
|---|---|---|
| JP | 2010-022163 A | 6/2010 |
| KR | 10-2012-0048200 A | 5/2012 |
| KR | 10-2012-0130432 A | 12/2012 |

* cited by examiner

SIGNAL GENERATION CIRCUIT

TECHNICAL FIELD

The invention relates to a signal generation circuit configured to generate a control signal corresponding to a current capacity to be supplied to a vehicle such as an electric car or the like.

BACKGROUND ART

Conventionally, there is known a vehicle charging system configured to supply a battery device installed in a vehicle with electric power from a power supply in a general household by connecting a receptacle and a charging port via a charging cable. For example, the receptacle is installed in a house and connected to a commercial power supply, and the charging port is provided in a vehicle such as an electric car or the like. For example, Japanese Patent Application Publication Number 2010-22163 (hereinafter referred to as "Document 1") discloses such a vehicle charging system.

A vehicle charging system described in Document 1 includes a charging cable, and a charging control device configured to control charging of a battery device, which a vehicle is equipped with, through the charging cable. The charging cable includes a power cable for supplying the battery device with electric power from an external power supply, and a signal generation circuit configured to generate a control signal (a pilot signal) corresponding to a current capacity to be supplied to the vehicle. The charging cable also includes a control line for transmitting a control signal to the vehicle, and a power supply control unit configured to perform power supply control based on a voltage level of the control line.

The charging control device includes a charging control unit and a status detection unit. The charging control unit is configured to control charging of the battery device based on a control signal if the charging cable is connected to the vehicle. The status detection unit is configured to detect malfunction (a defect) of the charging cable based on a signal level of the control line.

The vehicle charging system is configured, based on a pilot signal transmitted through the control line, to determine a connection status between the external power supply and the charging cable, and also determine whether or not to allow electric power from the external power supply to be supplied to the vehicle. This communication function (a CPLT function) between the charging cable and the vehicle is in conformity with SAEJ1772:2010 that belongs to SAE (Society of Automotive Engineers) standard. In this standard, the pilot signal is set to, for example, a zero voltage (0 V) while the external power supply is cut off.

In the vehicle charging system, the pilot signal is a zero voltage when the control line for the pilot signal is disconnected, but Document 1 is silent about changing the pilot signal to a zero voltage when the control line is not disconnected.

The conventional signal generation circuit included in the charging cable just outputs a pilot signal with a specified constant voltage, or oscillates a pilot signal so as to be a pulse train of specified voltage and frequency. In order to output a zero voltage from the conventional signal generation circuit, an output end of the signal generation circuit therefore needs to be connected to ground (earth) through a relay which is provided between the output end of the signal generation circuit and ground. This configuration has a problem of an increase in cost of the signal generation circuit because a comparatively expensive relay is additionally required.

SUMMARY OF INVENTION

The present invention has been achieved in view of the above circumstances, and an object thereof is to provide a signal generation circuit capable of outputting a pilot signal, which is a zero voltage, without a relay.

The present invention is a signal generation circuit (5) configured to generate a pilot signal for communication between a vehicle (200) and a charging cable (1). The vehicle (200) is equipped with a battery device (201). The signal generation circuit (5) comprises a circuit (5A), a first input unit (501), a second input unit (51), and a control unit (500). The circuit (5A) comprises an operational amplifier (OP1) configured to output the pilot signal. The first input unit (501) is configured to supply a non-inverted input terminal of the operational amplifier (OP1) with either a first signal or a second signal that is different from the first signal. The second input unit (51) is configured to supply an inverted input terminal of the operational amplifier (OP1) with either a first voltage or a second voltage that is different from the first voltage. The control unit (500) is configured to control each output of the first input unit (501) and the second input unit (51). Each of the first signal and the first voltage is a zero voltage. The circuit (5A) comprising the operational amplifier (OP1) is configured so that the operational amplifier (OP1) outputs an zero voltage if the first signal is supplied to the non-inverted input terminal of the operational amplifier (OP1) and the first voltage is supplied to the inverted input terminal of the operational amplifier (OP1).

In an embodiment, the signal generation circuit (5) comprises a power supply detection circuit (52) configured to detect whether or not the charging cable (1) is connected to an external power supply (AC1). The control unit (500) is configured to control each output of the first input unit (501) and the second input unit (51) so that the pilot signal becomes a zero voltage during part (t01 to t02) of a first time (T1) from a time point (t0) when the power supply detection circuit (52) detects that the charging cable (1) is connected to the external power supply (AC1).

In an embodiment, the signal generation circuit (5) further comprises: a first power supply (53) configured to generate positive and negative voltages for activating the operational amplifier (OP1); and a second power supply (54) configured to generate a voltage for activating the control unit (500). The first time (T1) is set to at least a rise time of the first power supply (53). A rise time of the second power supply (54) is shorter than that of the first power supply (53).

In an embodiment, the signal generation circuit (5) further comprises a power supply detection circuit (52) configured to detect whether or not the charging cable (1) is connected to an external power supply (AC1). The control unit (500) is configured to control each output of the first input unit (501) and the second input unit (51) so that the pilot signal becomes a zero voltage during a second time (T2) from a time point (t6) when the power supply detection circuit (52) detects power shutdown of an external power supply (AC1).

In an embodiment, the signal generation circuit (5) further comprises: a first power supply (53) configured to generate positive and negative voltages for activating the operational amplifier (OP1); and a second power supply (54) configured to generate a voltage for activating the control unit (500). The second time (T2) is set to at least a fall time of the first power supply (53). The second power supply (54) is configured to supply a specified voltage to the control unit (500) and the second input unit (51) during at least the second time (T2) from a time point (t6) when the charging cable (1) is disconnected from the external power supply (AC1).

In an embodiment, the circuit (5A) comprising the operational amplifier (OP1) further comprises: a resistor (R4) connected between the first input unit (501) and the non-inverted input terminal of the operational amplifier (OP1); and a resistor (R5) connected between the non-inverted input terminal and an output terminal of the operational amplifier (OP1).

In an embodiment, the second input unit (51) comprises: a voltage divider comprising first and second resistors (R6 and R7) connected in series with each other; and a switching device (Q1) configured to be turned on and off in accordance with a switching signal from the control unit (500). A junction of the first and second resistors (R6 and R7) is connected to the inverted input terminal of the operational amplifier (OP1). A first end of the second resistor (R7) is connected to the first resistor (R6), while a second end of the second resistor (R7) is connected to ground. The switching device (Q1) is connected in parallel with the second resistor (R7).

In the invention, the circuit (5A) comprising the operational amplifier (OP1) corresponds to a comparator, and can output a pilot signal which is a zero voltage, when a zero voltage is supplied to each input terminal of the operational amplifier. That is, the invention can output a pilot signal, which is a zero voltage, without a relay like the conventional signal generation circuit.

BRIEF DESCRIPTION OF DRAWINGS

Preferred embodiments of the invention will now be described in further details. Other features and advantages of the present invention will become better understood with regard to the following detailed description and accompanying drawings where:

FIG. 1A is a schematic diagram of the signal generation circuit, and FIG. 1B is a schematic diagram of a reference voltage circuit in the signal generation circuit;

FIG. 7A is a schematic diagram of the signal generation circuit, and FIG. 7B shows a relay connected to a control line.

DESCRIPTION OF EMBODIMENTS

Hereinafter, a signal generation circuit 5 in accordance with an embodiment of the present invention is explained. A vehicle charging system including the signal generation circuit 5 is first explained. As shown in FIG. 1, the vehicle charging system is configured to charge a battery device 201 installed in a vehicle 200 such as an electric car, a plug-in hybrid electric vehicle or the like.

Figure 4:
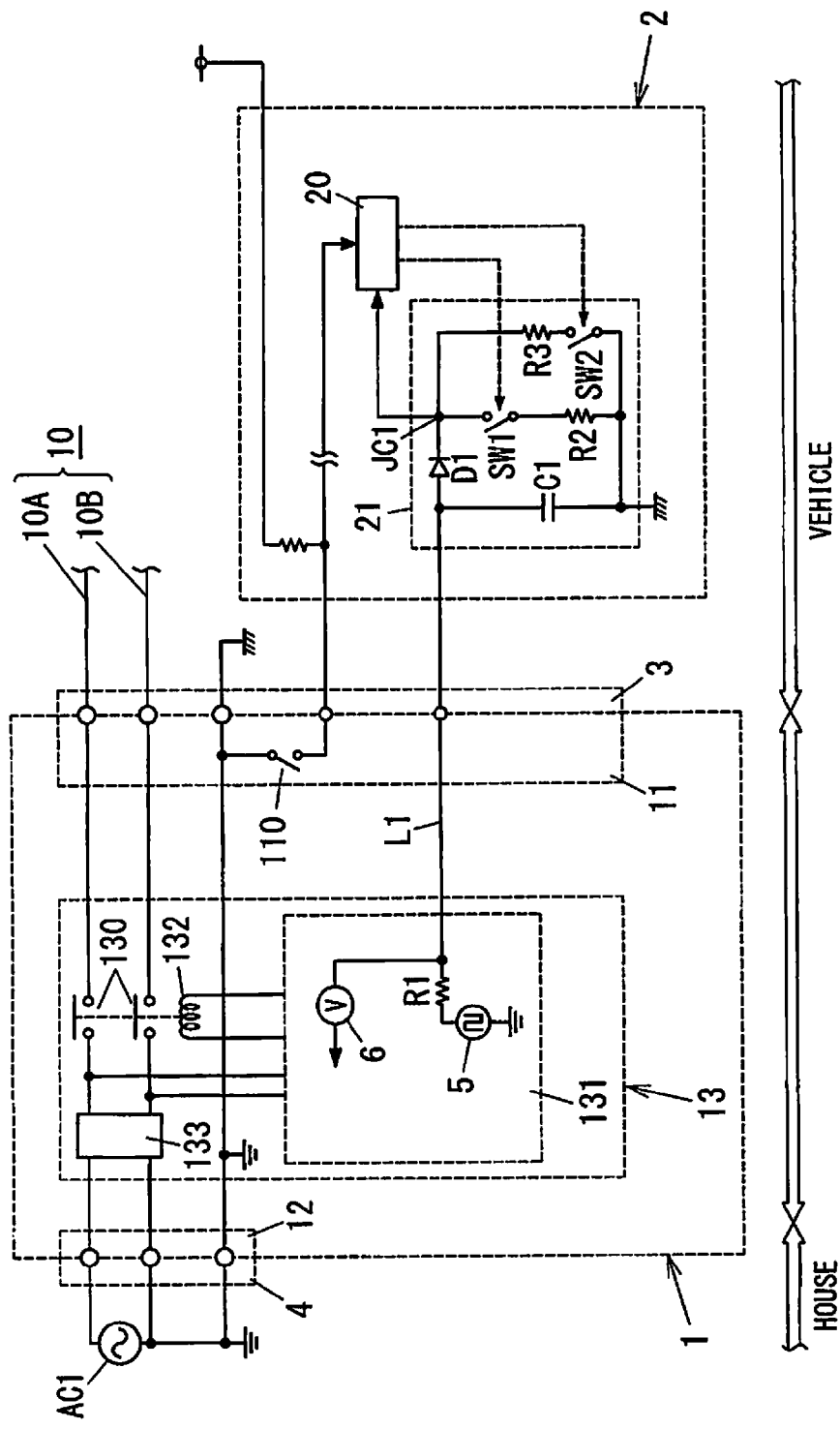
FIG. 4 is a schematic diagram of a vehicle charging system including the signal generation circuit.

As shown in FIG. 4, the vehicle charging system of the embodiment includes a charging cable 1 and an ECU 2. The "ECU" is an abbreviation of "Electronic Control Unit". The ECU 2 of the embodiment functions as a charging control device configured to control charging of the battery device 201 installed in the vehicle 200 through the charging cable 1.

The charging cable 1 is configured to connect the battery device 201 of the vehicle 200 to an external power supply AC1 (e.g., a system power supply). In the example of FIG. 4, the charging cable 1 includes a power cable 10, a connector 11, a plug 12 and a CCID 13. The "CCID" is an abbreviation of "Charging Circuit Interrupt Device". The power cable 10 is used for balanced line between the vehicle 200 and the external power supply AC1. In the example of FIG. 4, the power cable 10 includes a hot line 10A and a cold line 10B.

The connector 11 is configured to be connected to a charging inlet 3 provided in the vehicle 200. In the example of FIG. 4, the connector 11 is provided with a limit switch 110 that intervenes between ground and the ECU 2 (a microcomputer 20). The limit switch 110 is configured to be activated if the connector 11 is connected to the charging inlet 3, and to supply a cable connection signal to the ECU 2. The cable connection signal represents that the connector 11 is connected to the charging inlet 3.

As shown in FIG. 4, the plug 12 is configured to be connected to a power receptacle 4 provided in, for example, a house. By connecting the plug 12 to the power receptacle 4, AC (alternating current) power from the external power supply AC1 is supplied to the charging cable 1.

As shown in FIG. 4, the CCID 13 includes a relay 130, a control pilot circuit 131, an electromagnetic coil 132 and a leakage detector 133. The relay 130 is provided in the power cable 10. The control pilot circuit 131 is configured to turn the relay 130 on and off. When the relay 130 is turned off, an electric circuit for supplying the vehicle 200 with electric power from the external power supply AC1 is shut off. When the relay 130 is turned on, electric power from the external power supply AC1 is allowed to be supplied to the vehicle 200.

Figure 2:
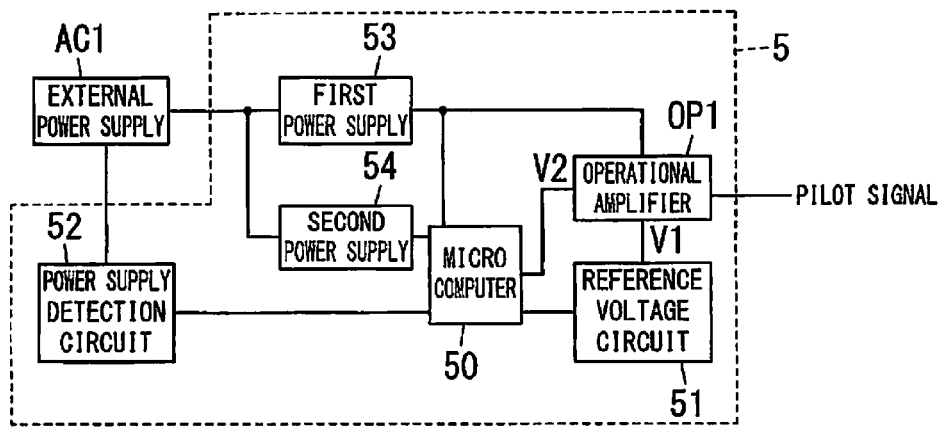
FIG. 2 is a block diagram of the signal generation circuit.

As shown in FIG. 4, the control pilot circuit 131 includes the signal generation circuit 5, a resistor R1 and a voltage sensor 6. As shown in FIG. 2, the signal generation circuit 5 includes a controller (a microcomputer) 50 and a power supply detection circuit 52. The microcomputer 50 is formed of a CPU (not shown), a ROM (not shown) storing a control program to be executed by the CPU, a RAM to be employed as a working area, and the like. The power supply detection circuit 52 is configured to detect an output voltage of the external power supply AC1 through the plug 12 to detect whether or not the charging cable 1 is connected to the external power supply AC1 based on the output voltage.

The signal generation circuit 5 is configured, in accordance with control of the microcomputer 50, to generate a pilot signal (a CPLT (Control Pilot Circuit) signal) that is a pulse train of specified voltage and frequency, and to output the pilot signal. In the present embodiment, the specified voltage is +/−12 V, and the specified frequency is 1 kHz. The pilot signal is used for communication between the vehicle 200 equipped with the battery device 201, and the charging cable 1. The signal generation circuit 5 is also configured to generate and output a pilot signal of a specified constant voltage in accordance with control of the microcomputer 50, where the specified constant voltage is a first output voltage. The first output voltage is 12 V in the embodiment. The ECU 2 receives a pilot signal through the resistor R1 and a control line L1 and can thereby confirm a connection status between the vehicle 200 and the external power supply AC1, and detect a charging current to be supplied to the vehicle 200. The signal generation circuit 5 will be detailed later. The voltage sensor 6 is connected to the control line L1 and configured to detect a voltage of a pilot signal.

The electromagnetic coil 132 is configured to generate electromagnetic force if the control pilot circuit 131 supplies an electric current to the electromagnetic coil 132, and to turn the relay 130 on by the electromagnetic force. The electromagnetic coil 132 is configured to stop generating the electromagnetic force if the control pilot circuit 131 stops supplying the electric current to the electromagnetic coil 132, and to turn the relay 130 off.

As shown in FIG. 4, the leakage detector 133 is provided in the power cable 10 and configured to detect whether or not electric leakage occurs. Specifically, the leakage detector 133 is configured to detect a balanced status of electric currents flowing through the hot and cold lines 10A and 10B in opposite directions, and to detect an occurrence of electric leakage if detecting an unbalanced status of the electric currents. The control pilot circuit 131 is configured to stop supplying power (an electric current) to the electromagnetic coil 132 if the leakage detector 133 detects the occurrence of electric leakage, and to turn the relay 130 off. As a result, it is possible to shut off the electric circuit for supplying the vehicle 200 with electric power from the external power supply AC1.

As shown in FIG. 4, the ECU 2 includes the microcomputer 20 and a switch circuit 21. The microcomputer 20 is formed of a CPU, a ROM, a RAM and the like in the same way as the microcomputer 50. The microcomputer 20 is configured to execute charging control processing for charging the battery device 201 based on a pilot signal transmitted through the control line L1. The microcomputer 20 is also configured to execute switch processing for stepwise changing a voltage of a pilot signal by controlling the switch circuit 21.

As shown in FIG. 4, the switch circuit 21 includes a capacitor C1, a diode D1, pull-down resistors R2 and R3, a first switch SW1 and a second switch SW2. The capacitor C1 is connected in parallel with a series circuit of the resistor R1 and the signal generation circuit 5 through the control line L1 with the connector 11 connected to the charging inlet 3. The microcomputer 20 is configured to monitor electric potential on a junction JC1 between two series circuits connected in parallel with each other. One of the series circuits is formed of the first switch SW1 and the pull-down resistor R2, while the other is formed of the second switch SW2 and the pull-down resistor R3. The junction JC1 is connected to the control line L1 through the diode D1. In short, the microcomputer 20 is configured to monitor a voltage of a pilot signal by monitoring the electric potential on the junction JC1.

The switch circuit 21 is configured to change a voltage of a pilot signal by turning the switches SW1 and SW2 on or off in accordance with a control signal from the microcomputer 20. That is, the switch circuit 21 is configured, if one of the switches SW1 and SW2 (e.g., the second switch SW2) is turned on in accordance with a control signal (a close signal) from the microcomputer 20, to switch and decrease a voltage of a pilot signal to a second output voltage though one of the pull-down resistors R2 and R3 (e.g., the pull-down resistor R3). The second output voltage is a specified voltage lower than the first output voltage. In the embodiment, the second output voltage is 9 V. The switch circuit 21 is also configured, if the switches SW1 and SW2 are turned on in accordance with a control signal (two close signals) from the microcomputer 20, to switch and decrease a voltage of a pilot signal to a third output voltage through the pull-down resistors R2 and R3. The third output voltage is a specified voltage lower than the second output voltage. In the embodiment, the third output voltage is 6 V.

Figure 5:
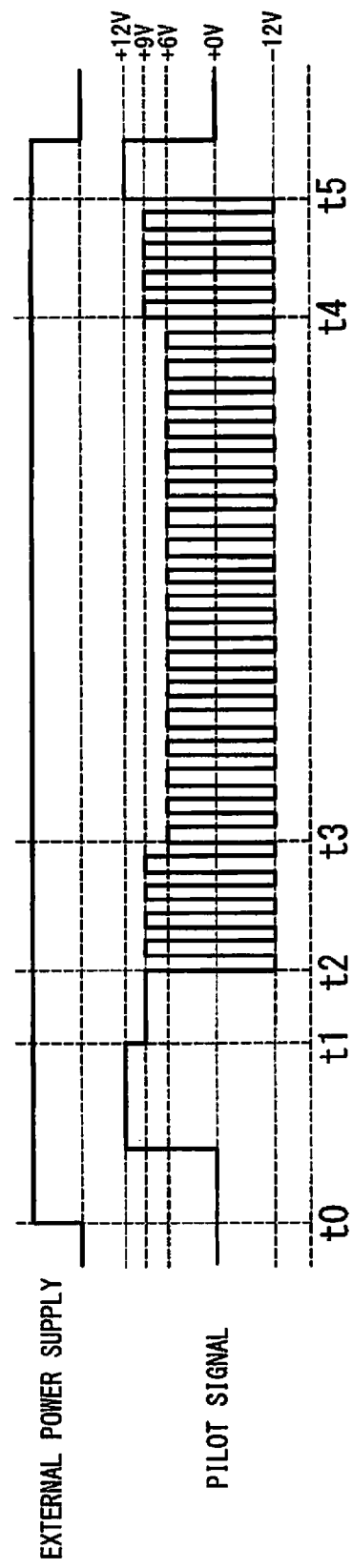
FIG. 5 is a wave form chart showing an operation of the vehicle charging system.

Hereinafter, the CPLT function (a communication function with a vehicle) in the vehicle charging system of the embodiment is explained with reference to FIG. 5. The CPLT function is in conformity with SAEJ1772:2010 that belongs to SAE (Society of Automotive Engineers) standard.

At time t0, the plug 12 is connected to the power receptacle 4, and the power supply detection circuit 52 then detects a connection between the charging cable 1 and the external power supply AC1. The power supply detection circuit 52 then supplies the microcomputer 50 with a signal (a power connection signal) representing that the charging cable 1 is connected to the external power supply AC1. The microcomputer 50 allows the signal generation circuit 5 to output a pilot signal that is the first output voltage (12 V) if receiving the power connection signal. Hereinafter, a status that a voltage of the pilot signal is the first output voltage (12 V) is referred to as "status 1 (a first status)". In status 1, the charging cable 1 is disconnected from the vehicle 1.

At time t1, the connector 11 is connected to the charging inlet 3 of the vehicle 200, and the limit switch 110 is then activated (turned on) to supply a cable connection signal to the microcomputer 20 of the ECU 2. The microcomputer 20 receives the cable connection signal and then supplies a control signal (a close signal) to the second switch SW2 to turn the second switch SW2 on. As a result, the voltage of the pilot signal decreases from the first output voltage to the second output voltage (9 V). Hereinafter, a status that the voltage of the pilot signal is the second output voltage (9 V) is referred to as "status 2 (a second status)". In status 2, the charging cable 1 is connected to the vehicle 200, but preparation for charging the battery device 201 is not ready yet.

Figure 6:
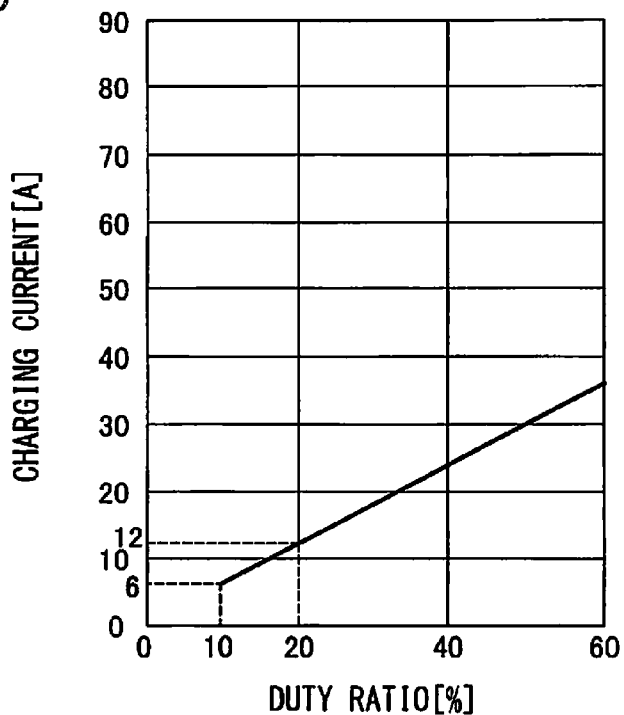
FIG. 6 is a correlation diagram between a charging current and a duty ratio of a pilot signal in the vehicle charging system.

At time t2, the voltage sensor 6 detects that the voltage of the pilot signal is the second output voltage (9 V), and the microcomputer 50 then allows the signal generation circuit 5 to output a pilot signal that is a pulse train of the specified frequency (an oscillation frequency of 1 kHz). The microcomputer 50 has a PWM function and is configured to change a duty ratio of the pilot signal through the PWM function. The duty ratio of the pilot signal indicates an upper limit of a charging current. In an example of FIG. 6, the duty ratio of the pilot signal is 20% when the upper limit is 12 amperes, and is 10% when the upper limit is 6 amperes.

At time t3, the microcomputer 20 detects the duty ratio of the pilot signal to obtain an upper limit of a charging current, and then supplies a control signal (an additional close signal) to the first switch SW1 to turn the first switch SW1 on. As a result, the voltage of the pilot signal decreases from the second output voltage to the third output voltage (6 V). Hereinafter, a status that the voltage of the pilot signal is the third output voltage (6 V) is referred to as "status 3 (a third status)". In status 3, the charging cable 1 is connected to the vehicle 200, and the preparation for charging the battery device 201 is ready. In addition, the pilot signal can indicate "status 4 (a fourth status)" by a fourth output voltage (3 V) of the pilot signal.

The voltage sensor 6 detects that the voltage of the pilot signal is the third output voltage (6 V), and the microcomputer 50 then performs control for supplying an electric current to the electromagnetic coil 132. As a result, the relay 130 is turned on to close the electric circuit for supplying the battery device 201 of the vehicle 200 with electric power from the external power supply AC1 in order to start charging the battery device 201.

At time t4, the charging of the battery device 201 is completed, and the microcomputer 20 then supplies a control signal (an open signal) to the first switch SW1 to turn the first switch SW1 off. As a result, the voltage of the pilot signal increases from the third output voltage to the second output voltage (9 V). The voltage sensor 6 detects that the voltage of the pilot signal is the second output voltage (9 V), and the microcomputer 50 then stops supplying the electric current to the electromagnetic coil 132. As a result, the relay 130 is turned off to shut off the electric circuit for supplying the battery device 201 of the vehicle 200 with the electric power from the external power supply AC1.

The microcomputer 20 supplies a control signal (an additional open signal) to the second switch SW2 to turn the second switch SW2 off. As a result, the voltage of the pilot signal increases from the second output voltage to the first output voltage (12 V). At time t5, the voltage sensor 6 detects that the voltage of the pilot signal is the first output voltage (12 V), and the microcomputer 50 then stops oscillating the pilot signal.

Figure 7A:
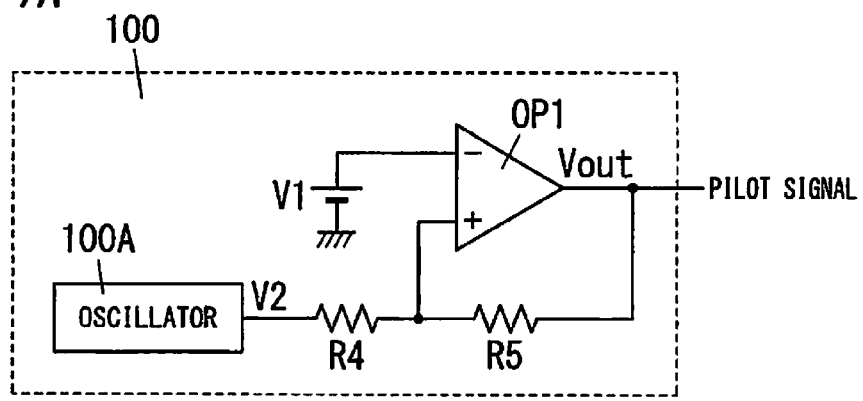
FIGS. 7A and 7B show a comparative example of a signal generation circuit.
Figure 7B:
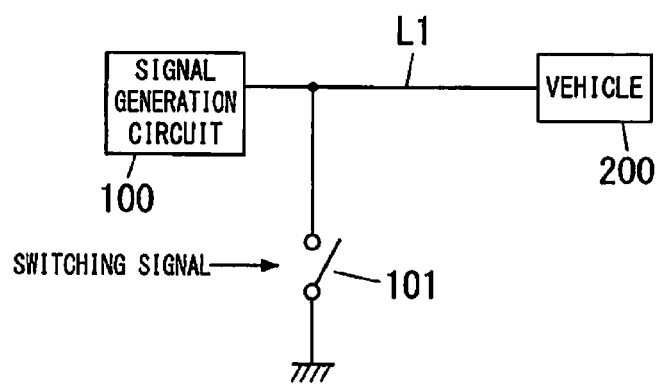

The pilot signal is required to be in conformity with SAE standard. For example, in a pilot signal that is a pulse train, rise and fall times thereof are required to be in conformity with SAE standard. Accordingly, in a conventional signal generation circuit, an operational amplifier having a high slew rate has been employed in order to generate a pilot signal that is in conformity with SAE standard. FIGS. 7A and 7B show a signal generation circuit 100 as a comparative example in consideration of the conventional signal generation circuit.

As shown in FIG. 7A, the signal generation circuit 100 includes an operational amplifier OP1, resistors R4 and R5, an oscillator 100A and a reference voltage source. The reference voltage source is configured to generate a reference voltage V1. The signal generation circuit 100 is configured so that an output V2 of the oscillator 100A is supplied, as an input voltage, to a non-inverted input terminal of the operational amplifier OP1 via the resistor R4, while a reference voltage V1 of the reference voltage source is supplied to an inverted input terminal of the operational amplifier OP1. The resistor R5 is connected between the non-inverted input terminal and an output terminal of the operational amplifier OP1. Thus, the signal generation circuit 100 includes the operational amplifier OP1 and the resistors R4 and R5 which constitute a circuit corresponding to a hysteresis comparator. The operational amplifier OP1 is activated by a positive voltage (e.g., 15 V) from a positive power supply (not shown) and a negative voltage (e.g., −15 V) from a negative power supply (not shown).

In the comparative example, a reference voltage V1 is applied to the inverted input terminal of the operational amplifier OP1. The reference voltage V1 is obtained by converting an AC voltage of an external power supply AC1 into a DC (direct current) voltage through, for example, an AC-DC converter to divide the DC voltage through a voltage divider. An output V2 of the oscillator 100A is applied to the non-inverted input terminal of the operational amplifier OP1 via the resistor R4. The non-inverted input terminal of the operational amplifier OP1 is connected to the output terminal of the operational amplifier OP1 via the resistor R5. The oscillator 100A is configured to output pulse waves which are brought high and low alternately and repeatedly.

Hereinafter, an operation of the signal generation circuit 100 is explained. When the output V2 of the oscillator 100A is brought high, an input voltage of the non-inverted input terminal of the operational amplifier OP1 exceeds the reference voltage V1. In this case, the operational amplifier OP1 outputs an output voltage Vout of a high level (12 V). When the output V2 of the oscillator 100A is brought low, an input voltage of the non-inverted input terminal of the operational amplifier OP1 falls below the reference voltage V1. In this case, the operational amplifier OP1 outputs an output voltage Vout of a low level (−12 V). That is, the signal generation circuit 100 is configured to output a pilot signal of a specified constant voltage (12 V or −12 V), and also output a pilot signal that is a pulse train of specified voltage and frequency (+1-12 V and 1 kHz).

A status different from the aforementioned statuses 1 to 4 is present in connection conditions between the vehicle 200 and the charging cable 1. For example, the status different from statuses 1 to 4 is a status that electric power to be supplied from the external power supply AC1 is not available, such as in a case of recovering from a power outage of the external power supply AC1, conducting a leakage test, or the like. This status can be indicated to a vehicle by setting a voltage of a pilot signal to 0 V (a zero voltage). Hereinafter, a status in which a voltage of a pilot signal is a zero voltage is referred to as "status 5 (a fifth status)".

However, the signal generation circuit 100 cannot output a pilot signal of which voltage is a zero voltage. Accordingly, in the comparative example, a relay 101 needs to be arranged between a control line L1 and ground as shown in FIG. 7B. In this case, a pilot signal that is a zero voltage can be output by turning the relay 101 on. However, there is a problem of an increase in cost because the relay 101 that is a comparatively expensive electronic part is required.

Figure 1A:
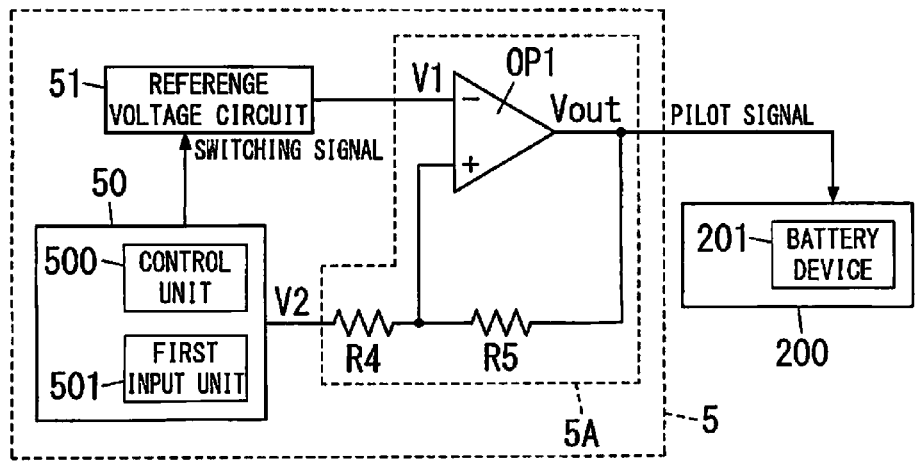
FIGS. 1A and 1B show a signal generation circuit in accordance with an embodiment of the present invention.
Figure 1B:
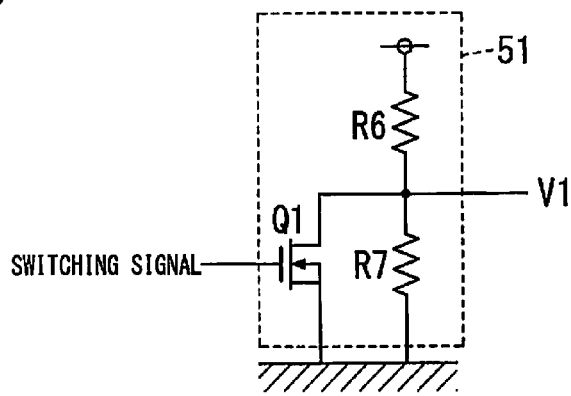

In order to solve the problem, the signal generation circuit 5 of the embodiment is configured to output a pilot signal of which voltage is a zero voltage. Hereinafter, the signal generation circuit 5 of the embodiment is explained with reference to figures. As shown in FIG. 2, the signal generation circuit 5 of the embodiment includes a reference voltage circuit 51, the power supply detection circuit 52, a first power supply 53 and a second power supply 54. As shown in FIG. 1A, the signal generation circuit 5 includes an operational amplifier OP1, resistors R4 and R5, a microcomputer 50 and a reference voltage circuit 51, and the operational amplifier OP1 and the resistors R4 and R5 constitute a circuit 5A corresponding to a hysteresis comparator. The circuit 5A is configured so that the operational amplifier OP1 outputs an zero voltage if a zero voltage (a first signal) is supplied to the non-inverted input terminal of the operational amplifier OP1 and a zero voltage (a first voltage) is supplied to the inverted input terminal of the operational amplifier OP1. The operational amplifier OP1, and the resistors R4 and R5 are the same as those of the signal generation circuit 100, and are not described in detail herein.

The power supply detection circuit 52 is configured to detect whether or not the charging cable 1 is connected to the external power supply AC1. The first power supply 53 is configured to receive an output voltage of the external power supply AC1 to generate positive and negative voltages for activating the operational amplifier OP1. The second power supply 54 is configured to receive the output voltage of the external power supply AC1 to generate a voltage for activating the microcomputer 50 and the reference voltage circuit 51. The power supply 53 and the power supply 54 are well known, and are not described in detail herein.

The microcomputer 50 (a first input unit 501) has a PWM function and is configured, through the PWM function, to generate pulse waves (a second signal) V2 which are brought high and low alternately and repeatedly, and to supply the second signal V2 to a non-inverted input terminal of the operational amplifier OP1. The microcomputer 50 (the first input unit 501) is also configured to keep the output V2 in the first signal (a zero voltage). That is, the microcomputer 50 includes the first input unit 501 configured to supply the non-inverted input terminal of the operational amplifier OP1 with either the first signal or the second signal different from the first signal. The first signal is a zero voltage.

The reference voltage circuit 51 (a second input unit) is configured to supply the inverted input terminal of the operational amplifier (OP1) with either the first voltage or a second voltage that is different from the first voltage. The first voltage is a zero voltage. In an example of FIG. 1B, the reference voltage circuit 51 is formed of a series circuit of resistors R6 and R7 (a voltage divider), and a switching device Q1 connected in parallel with the resistor R7. A first end of the resistor R7 is connected to the resistor R6, while a second end of the resistor R7 is connected to ground. For example, the reference voltage circuit 51 is configured to divide an output voltage of the second power supply 54 through the voltage divider to supply an inverted input terminal of the operational amplifier OP1 with the divided voltage as a reference voltage V1. That is, a junction of the resistors R6 and R7 is connected to the inverted input terminal of the operational amplifier OP1. The switching device Q1 is, for example, an n-type MOSFET and a drain terminal and a source terminal thereof are connected with a junction of the resistors R6 and R7 and ground, respectively. The microcomputer 50 is configured to supply a switching signal (an output control signal) to a gate terminal of the switching device Q1. That is, the switching device Q1 is configured to be turned on and off in accordance with a switching signal from the control unit 500.

That is, the reference voltage circuit 51 is configured to connect the junction of the resistors R6 and R7 to ground if the switching device Q1 is turned on according to a switching signal (an ON signal) of the microcomputer 50, thereby outputting a zero voltage (the first voltage). The reference voltage circuit 51 is also configured to output a voltage (the second voltage) obtained by dividing the output voltage of the second power supply 54 if the switching device Q1 is turned off according to a switching signal (an OFF signal) of the microcomputer 50. That is, the reference voltage circuit 51 is configured to supply the inverted input terminal of the operational amplifier OP1 with either the first voltage or the second voltage different from the first voltage, and functions as the second input unit.

As mentioned above, the microcomputer 50 is configured to control an output V2 of the first input unit 501, and also to supply a switching signal to the reference voltage circuit 51 as the second input unit to control the reference voltage V1. That is, the microcomputer 50 includes a control unit 500 in addition to the first input unit 501, and the control unit 500 is configured to control output voltages of the first input unit 501 and the second input unit.

An operation of the signal generation circuit 5 is explained. When an output V2 of the microcomputer 50 (the first input unit 501) is brought high, an input voltage of the non-inverted input terminal of the operational amplifier OP1 exceeds a reference voltage V1. As a result, the operational amplifier OP1 outputs an output voltage Vout of a high level (12 V). When an output V2 of the microcomputer 50 is brought low, an input voltage of the non-inverted input terminal of the operational amplifier OP1 falls below a reference voltage V1. As a result, the operational amplifier OP1 outputs an output voltage Vout of a low level (−12 V). That is, the signal generation circuit 5 is configured to output a pilot signal of a specified constant voltage (12 V), or a pilot signal that is a pulse train of specified voltage and frequency (+/−12 V and 1 kHz), in the same way as the signal generation circuit 100.

An output voltage Vout of the operational amplifier OP1 is given by $$V_{out} = V1 - G(V2 - V1),$$

where V1 is a reference voltage, V2 is an output voltage of the microcomputer 50, and G represents a value obtained by dividing a resistance value of the resistor R5 by a resistance value of the resistor R4.

From the equation, it can be seen that the signal generation circuit 5 can output a zero voltage signal as a pilot signal by changing each of the reference voltage V1 and the output V2 to a zero voltage. Therefore, the microcomputer 50 (the first input unit 501) is configured to output the first signal (a zero voltage) as mentioned above, while the reference voltage circuit 51 is configured to turn the switching device Q1 on in accordance with a switching signal (an ON signal) of the microcomputer 50 to set the reference voltage V1 to a zero voltage (the first voltage).

The signal generation circuit 5 of the embodiment includes the operational amplifier OP1, the first input unit 501 of the microcomputer 50 and the reference voltage circuit (the second input unit) 51. The signal generation circuit 5 can output a zero voltage signal as a pilot signal by changing each input voltage of input terminals of the operational amplifier OP1 to a zero voltage. That is, the signal generation circuit 5 of the embodiment can output a zero voltage pilot signal without using a comparatively expensive electronic part like the relay 101 of the signal generation circuit 100. Thus, in the embodiment, the comparatively expensive electronic part like the relay 101 is unnecessary, and manufacturing cost can be reduced.

In the embodiment, the microcomputer 50 includes the first input unit 501, and the reference voltage circuit 51 formed of the resistors R6 and R7 and the switching device Q1 corresponds to the second input unit. Therefore, in the embodiment, a zero voltage pilot signal can be realized by inexpensive electronic parts.

Figure 3:
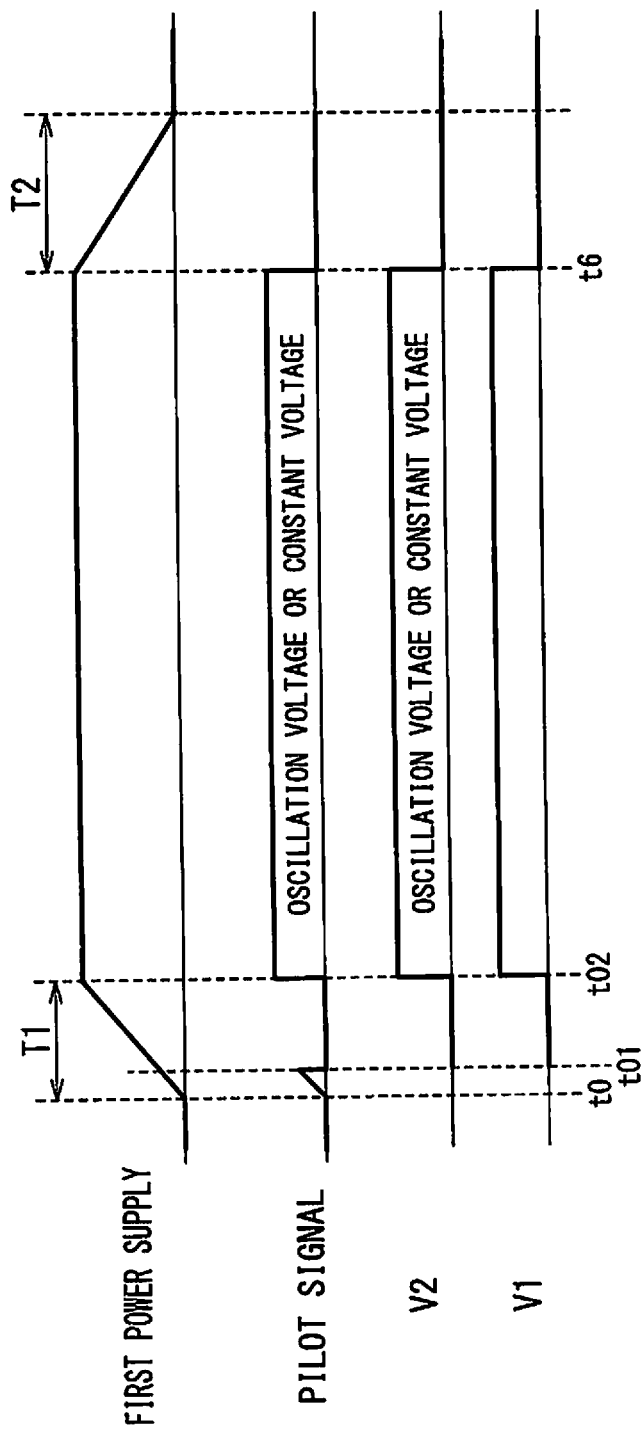
FIG. 3 is a wave form chart showing an operation of the signal generation circuit.

As shown in FIG. 3, from time point t0 when the charging cable 1 is connected to the external power supply AC1, a voltage of the first power supply 53 starts rising to reach a specified constant voltage (e.g., 15 V) at time point t02. A constant time from time point t0 to time point t02 is called a rise time. Even just after recovering from the occurrence of a power outage with the charging cable 1 connected to the external power supply AC1, it takes a constant time until a voltage of the first power supply 53 reaches the constant voltage. Thus, before a voltage of a pilot signal reaches the specified constant voltage, the control pilot circuit 131 and the ECU 2 may detect a status in error which causes malfunction.

For example, just after the charging cable 1 is connected to the external power supply AC1, the control pilot circuit 131 and the ECU 2 normally detect "status 1". However, before a voltage of a pilot signal reaches the specified constant voltage, the control pilot circuit 131 and the ECU 2 may detect a status such as "status 2" or "status 3" in error.

In the embodiment, the microcomputer 50 (the control unit 500) is configured (through the first input unit 501) to keep the output V2 in a zero voltage (the first signal) during part (t01 to t02) of a constant time (a first time T1) measured from time point t0 when the power supply detection circuit 52 detects a connection between the charging cable 1 and the external power supply AC1 (see V2 of FIG. 3). The microcomputer 50 (the control unit 500) is also configured to supply a switching signal (an ON signal) to the switching device Q1 to turn the switching device Q1 on, thereby changing the reference voltage V1 of the reference voltage circuit 51 to a zero voltage (during from time point t01 to time point t02 in the example of FIG. 3).

In an example, the first time T1 is measured by the power supply detection circuit 52, and is set to at least the rise time of the first power supply 53. In the example of FIG. 3, the first time T1 is set to the rise time, and the microcomputer 50 is configured to start operating at time point t01 between time point t0 and time point t02 to keep the output V2 in the first signal during a remaining time (t01 to t02) of the first time T1 measured from time point t01. That is, a rise time of a voltage (e.g., 5 V) of the second power supply 54 is shorter than that of the voltage (e.g., 15 V) of the first power supply 53. It is desirable that the first and second power supplies 53 and 54 are configured so that a voltage of the first power supply 53 at the end (t01) of the rise time of the second power supply 54 becomes lower than a minimum voltage (the fourth output voltage), which is higher than a zero voltage, of a plurality of voltages respectively corresponding to a plurality of statuses (statuses 1 to 5) indicated by the pilot signal.

As shown in FIG. 3, a voltage of the pilot signal becomes lower than any voltage corresponding to statuses 1 to 4 before the microcomputer 50 is activated from time point when a connection between the charging cable 1 and the external power supply AC is detected (t0 to t01). The voltage of the pilot signal then becomes a zero voltage between time point t01 and time point t02. As a result, the control pilot circuit 131 and the ECU 2 can detect "status 5". In "status 5", the control pilot circuit 131 and the ECU 2 do not perform control for charging. It is therefore possible to prevent malfunction of the control pilot circuit 131 and the ECU 2.

As shown in FIG. 3, from time point t6 when the charging cable 1 is disconnected from the external power supply AC1, a voltage of the first power supply 53 gradually decreases. After a power outage occurs while the charging cable 1 is connected to the external power supply AC, a voltage of the first power supply 53 gradually decreases as well. In such power shutdown of the external power supply AC1, a voltage of the pilot signal fluctuates and the control pilot circuit 131 and the ECU 2 may detect a status in error which causes malfunction.

In the embodiment, the microcomputer 50 is configured to keep the output V2 in the first signal (a zero voltage) during a constant time (a second time T2) from time point t6 when the power supply detection circuit 52 detects power shutdown of the external power supply AC1 (see V2 of FIG. 3). The microcomputer 50 is also configured to supply a switching signal (an ON signal) to the switching device Q1 to turn the switching device Q1 on, thereby changing the reference voltage V1 of the reference voltage circuit 51 to the first voltage (a zero voltage) during the second time T2 from time point t6 (see V1 of FIG. 3).

In an example, the second time T2 is measured by the microcomputer 50 and set to at least a fall time of the first power supply 53. In addition, the second power supply 54 is configured to supply a specified voltage (e.g., 5 V) to the microcomputer 50 and the reference voltage circuit 51 during at least the second time T2 from time point when the charging cable 1 is disconnected from the external power supply AC1.

As shown in FIG. 3, the pilot signal becomes a zero voltage during the constant time T2 from time point t6 when power shutdown of the external power supply AC1 is detected. The control pilot circuit 131 and the ECU 2 can accordingly detect "status 5". In "status 5", the control pilot circuit 131 and the ECU 2 do not perform control for charging. It is therefore possible to prevent malfunction of the control pilot circuit 131 and the ECU 2.

The invention claimed is:

1. A signal generation circuit, configured to generate a pilot signal for communication between a vehicle equipped with a battery device, and a charging cable, wherein the signal generation circuit comprises:
   a circuit comprising an operational amplifier configured to output the pilot signal;
   a first input unit configured to supply a non-inverted input terminal of the operational amplifier with either a first signal or a second signal that is different from the first signal;
   a second input unit configured to supply an inverted input terminal of the operational amplifier with either a first voltage or a second voltage that is different from the first voltage; and
   a control unit configured to control each output of the first input unit and the second input unit, wherein
   each of the first signal and the first voltage is a zero voltage, and
   the circuit comprising the operational amplifier is configured so that the operational amplifier outputs a zero voltage if the first signal is supplied to the non-inverted input terminal of the operational amplifier and the first voltage is supplied to the inverted input terminal of the operational amplifier.

2. The signal generation circuit of claim 1, further comprising a power supply detection circuit configured to detect whether or not the charging cable is connected to an external power supply,
   wherein the control unit is configured to control each output of the first input unit and the second input unit so that the pilot signal becomes a zero voltage during part of a first time from a time point when the power supply detection circuit detects that the charging cable is connected to the external power supply.

3. The signal generation circuit of claim 2, further comprising:
   a first power supply configured to generate positive and negative voltages for activating the operational amplifier; and
   a second power supply configured to generate a voltage for activating the control unit, wherein
   the first time is set to at least a rise time of the first power supply, and
   a rise time of the second power supply is shorter than that of the first power supply.

4. The signal generation circuit of claim 1, further comprising a power supply detection circuit configured to detect whether or not the charging cable is connected to an external power supply,
   wherein the control unit is configured to control each output of the first input unit and the second input unit so that the pilot signal becomes a zero voltage during a second time from a time point when the power supply detection circuit detects power shutdown of an external power supply.

5. The signal generation circuit of claim 4, further comprising:
   a first power supply configured to generate positive and negative voltages for activating the operational amplifier; and
   a second power supply configured to generate a voltage for activating the control unit, wherein
   the second time is set to at least a fall time of the first power supply, and
   the second power supply is configured to supply a specified voltage to the control unit and the second input unit during at least the second time from a time point when the charging cable is disconnected from the external power supply.

6. The signal generation circuit of claim 1, wherein the circuit comprising the operational amplifier further comprises:
- a resistor connected between the first input unit and the non-inverted input terminal of the operational amplifier; and
- a resistor connected between the non-inverted input terminal and an output terminal of the operational amplifier.

7. The signal generation circuit of claim 1, wherein the second input unit comprises:
- a voltage divider comprising first and second resistors connected in series with each other, a junction of the first and second resistors being connected to the inverted input terminal of the operational amplifier; and
- a switching device configured to be turned on and off in accordance with a switching signal from the control unit, wherein
- a first end of the second resistor is connected to the first resistor, while a second end of the second resistor is connected to ground, and
- the switching device is connected in parallel with the second resistor.

* * * * *